United States Patent
Welch et al.

[15] 3,684,853
[45] Aug. 15, 1972

[54] INDUCTION SURFACE HEATING UNIT SYSTEM

[72] Inventors: Stanley B. Welch; Raymond L. Dills, both of Louisville, Ky.

[73] Assignee: General Electric Company

[22] Filed: Oct. 18, 1971

[21] Appl. No.: 190,228

[52] U.S. Cl. .......... 219/10.49, 219/10.67, 219/10.79
[51] Int. Cl. .................................................. H05b 1/02
[58] Field of Search..310/10.49, 10.51, 10.67, 10.75, 310/10.77, 10.79, 385–387, 420, 421, 424, 427, 432, 438, 457, 530

[56] References Cited

UNITED STATES PATENTS

| 2,841,137 | 7/1958 | Chace | 219/438 |
| 3,256,417 | 6/1966 | Merrett | 219/10.79 |

FOREIGN PATENTS OR APPLICATIONS

| 1,157,711 | 7/1969 | Great Britain | 219/10.49 |

*Primary Examiner*—R. F. Staubly
*Assistant Examiner*—B. A. Reynolds
*Attorney*—Richard L. Caslin, et al.

[57] ABSTRACT

An induction surface heating unit system for use in cooking foods having an induction heating coil driven with an ultrasonic frequency wave to pass an alternating magnetic flux through a cooking utensil that is supported on a plate above the heating coil. The utensil is of special laminated construction having a center core of high thermal conductivity, non-magnetic material and a thin outer skin bonded to the core and being of magnetic and high electrical resistivity material. The induction heating coil functions as the primary winding of a transformer and the outer skin of the utensil functions as a short-circuited single-turn secondary winding such that current flowing through the utensil causes a heating effect to take place in the utensil itself. The impedance of the utensil is matched to the power conversion circuit of the heating coil for best overall efficiency of coupling the power to the load. The center core serves as a heat spreader to distribute the heat uniformly throughout the utensil.

6 Claims, 3 Drawing Figures

3,684,853

INDUCTION SURFACE HEATING UNIT SYSTEM

BACKGROUND OF THE INVENTION

The average woman today has become less interested in spending a great deal of time working in the kitchen preparing meals as there are so many more challenging opportunities for an intelligent person to occupy her time outside of housework, for instance, in civic, social or career work. This does not mean that people are willing to sacrifice nourishing meals in order to spend more productive or leisure time. The answer lies in developing new technologies for increasing the speed of preparing and cooking foods and by the use of more prepared foods such as frozen foods and dinners. One new technology for use in simplifying cooking is the microwave oven which is gaining wide acceptance at this time as it is able to cook foods in a fraction of the normal time and it is able to thaw frozen foods in minutes. It can cook foods in one-half to one-eighth of the normal cooking time by use of non-ionizing radiant energy similar to high frequency radio waves. This microwave energy penetrates the food causing the food molecules to vibrate resulting in friction and creating heat. This heat is distributed throughout the food and cooks it. This advance in the oven cooking art has focused more attention on the development of improved means of surface cooking of foods as a replacement for the standard metal sheathed electrical resistance heating elements. Another factor which has influenced increased activity in the induction surface heating unit art has been the success of the glass-ceramic, smooth surface cooktop. It provides ease of cleanability, an improved appearance, and the function of a solid work surface when the heating units are not energized. One technical characteristic that is difficult to overcome in both standard electric cooktops and glass-ceramic cooktops is the slowness of the heat-up and cool-down times when compared with a standard gas cooktop. For equal power inputs, the induction surface heating unit improves upon the speed of cooking over both standard electric and gas heating means and glass-ceramic cooktops and while doing so it may use a glass-ceramic, smooth surface cooktop for supporting the utensils.

The induction heating principle has been employed in induction iron and steel melting furnaces for many decades. The ordinary induction furnace is essentially a step-down transformer with an annular refractory hearth adjacent to a primary winding separtaed linked to it with an iron core. Metal charged in the hearth becomes a short-circuited secondary. When power is supplied to the primary winding, a flow of current is induced in the metal which causes it to heat. The same principle can be employed in devising an induction surface heating unit and one of the main advantages is that no heat is involved in the transfer of energy from the source of electrical power to the cooking utensil. Theoretically, it is a very efficient system which enables a truly cool cooking process.

The principle object of the present invention is to provide an induction surface heating unit system wherein the cooking utensil is impedance matched to the power conversion circuit so that the source of power will deliver the maximum possible output and the utensil will have a generally uniform temperature distribution for maximum thermal efficiency.

A further object of the present invention is to provide an induction surface heating unit system of the class described wherein the cooking utensil that serves as a short-circuited single-turn secondary winding of the transformer also has high thermal conductivity properties to obtain generally uniform temperature conditions within the bottom portion of the utensil.

A further object of the present invention is to provide a special cooking utensil for an induction surface heating unit system wherein the utensil is formed of laminated material that is magnetic and has relatively high electrical resistance and high thermal conductivity.

A further object of the present invention is to provide an induction surface heating unit system of the class described with the use of a laminated or composite material having a core of high thermal conductivity non-magnetic material in order to spread out the heat that is generated in the magnetic skin material.

A further object of the present invention is to provide a laminated cooking utensil for an induction surface heating unit system wherein high electric resistivity magnetic material is employed of several thin skin layers which are separated from each other by a non-magnetic core material of high thermal conductivity to obtain maximum power loading.

SUMMARY OF THE INVENTION

The present invention, in accordance with one form thereof, relates to an induction surface heating unit system having an induction heating coil mounted beneath a cooking utensil support plate with a cooking utensil resting on the top of the support plate such that the heating coil functions in the manner of the primary winding of a transformer while portions of the cooking utensil function in the manner of a short-circuited single-turn secondary winding. The cooking utensil is formed of laminated materials with a center core of high thermal conductivity and a thin outer skin bonded thereto and being of ferromagnetic material with high electrical resistivity whereby the heating of the utensil takes place in the outer skin in the area substantially directly above the underlying heating coil and this heat is transferred by large area conduction to the center core which in turn spreads the heat laterally to obtain generally uniform temperatures within the bottom of the utensil.

BRIEF DESCRIPTION OF THE DRAWINGS

Our invention will be better understood from the following description taken in conjunction with the accompanying drawings and its scope will be pointed out in the appended claims.

DESCRIPTION OF THE PREFERRED EMBODIMENT

Figure 1:
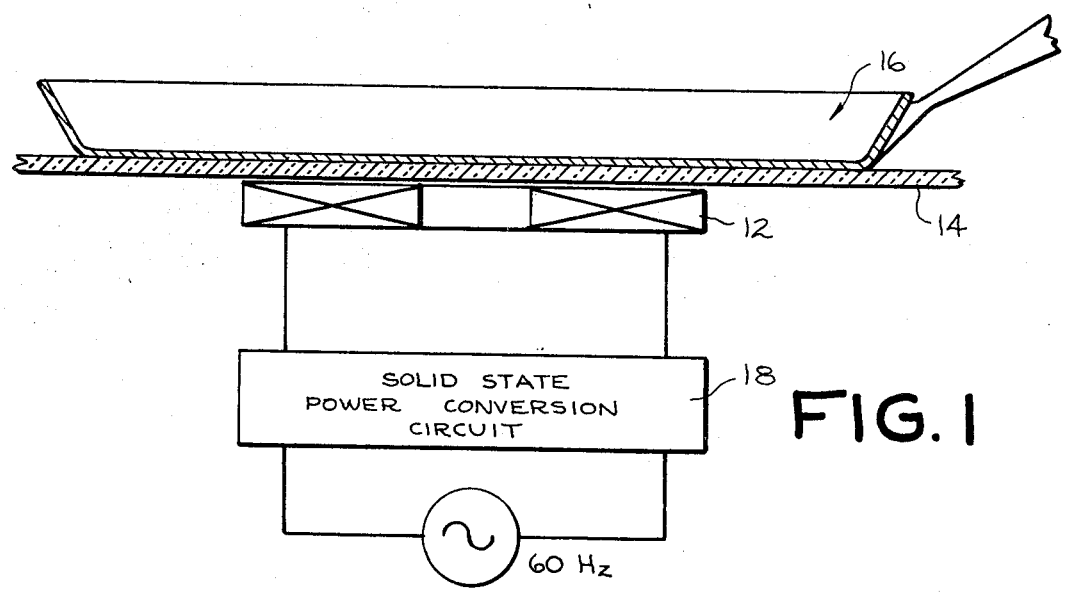
FIG. 1 is a diagrammatic vertical cross-sectional view illustrating the relation of an induction heating coil to the cooking utensil support plate that supports a large size cooking utensil such as a frying pan embodying the present invention.

Turning now to a consideration of the drawings and in particular to FIG. 1, there is shown a single induction surface heating unit system embodying the present invention as being one of several such units that would be combined to form the cooktop of an electric range. It is understood that a similar induction surface heating unit could also be employed as a portable cooking appliance or plate units. First, there is an induction heating coil 12 positioned beneath a utensil support plate or cooktop 14 that in turn carries a special cooking utensil 16 of the present invention. The utensil support plate 14 is preferably of non-metallic material such as laminated plastic as is used for kitchen countertops or glass-ceramic plate material sold under such trade names as PYROCERAM, HERCUVIT and CERVIT. This utensil support plate 14 is not a member that becomes heated by the action of the heating coil 12 since the support plate is a non-magnetic and non-conducting material, however, it does become heated by the high temperatures reached by the cooking utensil 16. Therefore, it is necessary that this support plate be able to withstand temperatures up to about 500° F. without becoming damaged.

The induction heating coil 12 is provided with a solid-state power conversion circuit 18 for converting a standard, single phase, readily available 60 Hz, 120 volt or 240 volt source of alternating current potential to an ultrasonic frequency wave for driving the induction heating coil 12. Operation of the solid-state power conversion circuit 18 serves to impress an ultrasonic frequency wave on the induction heating coil 12 and this results in the generation of an alternating magnetic field. The magnetic flux, in particular the flux emanating from the top of coil 12 is coupled across the air gap through the non-metallic utensil support plate 14 to the cooking utensil 16. An ultrasonic frequency above about 18 kHz is normally considered to be the upper range of human hearing and is selected to make the cooking unit inaudible to most people. This induction heating coil 12 is shown as a single layer, annular, flat spiral, air core coil wound with solid flat strip conductors or braided ribbon conductors with a rectangular cross-section. In order to generate sufficient magnetic flux to heat the cooking utensil 16 to the desired cooking temperature, induction coil 12 is tightly wound with the short cross-sectional dimension facing upwards and with adjacent turns separated by a flat insulating strip (not shown). It will be understood by those skilled in this art that while we have shown an air core coil, it is possible to substitute an iron core without sacrificing a great deal. To reduce the high frequency losses due to the skin effect, it is preferable to use a coil made with braided ribbon or by using a ribbon litz wire. Because of the usual physical constraints, only a limited number of ampere turns can be included in a practical induction heating coil. Since the power coupled to the utensil is theoretically proportional to the square of the ampere turns, the reduction of losses is of consequence in increasing the efficiency.

It is relatively efficient to transfer energy to the cooking utensil 16 to heat the utensil and, hence, the foods placed therein since the heat is generated in the high electric resistivity magnetic material of the utensil. Only a small fraction of the heat energy is lost because of leakage field in the air. The power conversion circuit 18 gives off some heat and, in certain installations, it has been decided to use a forced air cooling system (not shown) beneath the cooktop so as to increase the life of the electrical components, as well as to avoid overheating the utensil support plate 14. Most of the heat experienced by the utensil support plate 14 comes from the utensil 16 itself during prolonged frying and pan broiling operations when the utensil might reach a temperature as high as 450° F. The utensil support plate 14 operates as a relatively cool surface and it does not tend to become discolored because of spilled foods being burned or charred thereon. Accordingly, it is a relatively easy matter to keep the utensil support plate 14 clean by simply wiping with a damp cloth. Moreover, the support plate 14 can be used as a food preparation area or station such as for opening cans, trimming and cutting vegetables and meat, serving the dishes for the table or stacking the dishes for the dishwasher. Another advantage of induction cooking is that induction heating results in a low thermal mass system since there is relatively little storage of heat within the utensil 16. Hence, the temperature to which the utensil is heated can be changed rapidly as from room temperature to boiling to simmering to warming temperatures. This reduction in the thermal mass of the system makes the induction heating unit system more thermally efficient over anything used heretofore for surface cooking.

The cooking utensil 16 is of special laminated construction which has not been available heretofore. For optimum performance of an induction surface heating unit, special cooking utensils are necessary of materials that are magnetic and have relatively high electrical resistance in the bottom of the utensil. Utensils made of magnetic stainless steel (martensitic), porcelain enameled steel and cast iron are suitable for electrically matching the induction heating unit circuit and result in adequate heating of the utensil. For practical purposes, the heating action occurs only in the area directly above the induction coil 12. Many surface cooking operations, such as frying, require the use of utensils which are substantially larger in diameter than the preferred size of the induction coil 12 of about 7 inches. Utensils made of high resistivity materials, such as those listed above, have relatively poor thermal conductivity. Hence, a large diameter utensil made of these materials heats well in the area above the coil 12, but is substantially cooler in the areas beyond the coil. This results in uneven heating of the food and unsatisfactory cooking results.

Figure 3:
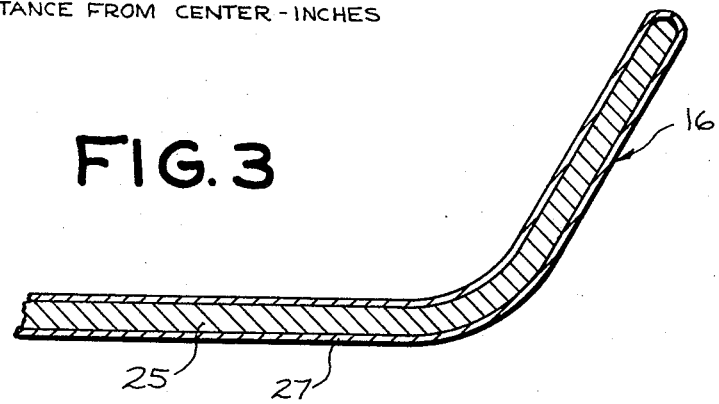
FIG. 3 is a fragmentary cross-sectional elevational view through one side of the cooking utensil of FIG. 1 to show the nature of the laminated material of the cooking utensil.

It has been found that a superior utensil for induction cooking can be made by using a laminated material as is illustrated in the fragmentary view of FIG. 3 comprising a relatively thick core 25 of high thermal conductivity such as copper, aluminum or silver and a thin outer skin intimately bonded thereto on top and bottom of high resistance magnetic material 27 such as iron, magnetic stainless steel (martensitic) or porcelain enameled steel. Preferably, the core material 25 is several times thicker than the outer skin material 27. Thus, the heating appears to occur in the two layers 27, 27 of high resistance magnetic material in the area over the induction coil 12. Then the heat is transferred by large area conduction to the high thermal conductivity material forming the core 25 which spreads the heat laterally to obtain relatively uniform heating of the utensil and, hence, the food placed therein. This heating effect will not work satisfactorily if the outer skin 27, 27 is low in resistance. This would create a bad impedance match and essentially short the transformer out. The load impedance should ideally equal the generator impedance.

Figure 2:
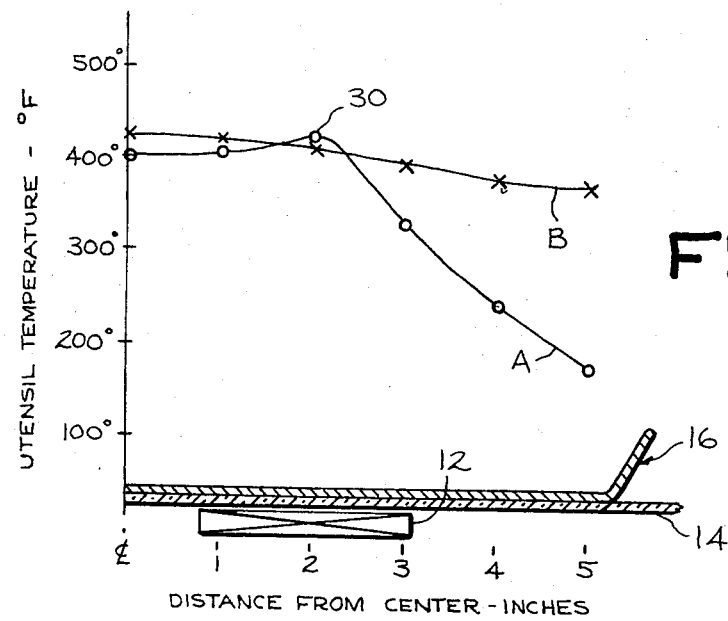
FIG. 2 is a combined illustration and temperature distribution graph showing the right half of both the induction heating coil and cooking utensil of FIG. 1 and comparing the temperature distribution of the special cooking utensil of this invention with that of a standard cooking utensil of laminated construction having an iron core and a stainless steel outer skin bonded thereto so as to depict the generally uniform temperature distribution in the cooking utensil of the present invention as compared with the prior art.

This temperature distribution across a laminated cooking utensil 16 of materials embodying the present invention is best illustrated in the temperature graph of FIG. 2. Illustrated along the bottom of the graph is the right half of the cooking utensil 16, and also showing one-half of the annular induction coil 12. The absicca is measured as the distance from the center of the utensil 16 in inches and the ordinate is measured as the utensil temperature in degrees Fahrenheit. There are two curves shown. The first curve A is a temperature curve of a large frying pan having a magnetic core material such as iron that is covered by an outer skin of non-magnetic stainless steel. Notice that the temperature at the geometric center of the pan is recorded as about 400° F. and that it rises slightly to a maximum of 425° F. directly over the center of the right half section of the induction coil 12 as at 30, and then the temperature drops off rapidly from that point such that the temperature adjacent the peripheral edge of the utensil reaches below half that temperature, namely, 175° F.

Now, attention is directed to the second temperature curve B using laminated or composite materials according to the present invention. The preferred embodiment of this invention has a center core 25 of copper material of about 0.050 inches and intimately bonded thereover is an outer skin of a 0.015 inch layer of porcelain enameled steel sold under the trade name "TI-NAMEL" which is sold by the Inland Steel Company. Notice that the temperature distribution is generally a flat curve starting at about 425° F. at the center of the utensil 16 and then drops only slightly as the distance from the center increases until the temperature at the periphery of the pan is only about 50° less or 375° F. Using "TI-NAMEL" steel, it is possible to apply porcelain enamel to the entire surface of the utensil, and this results in a utensil which has a pleasing appearance that also performs well in cooking and is relatively easy to keep clean. The following typical composition of TI-NAMEL is a representative analysis of the metal:

Carbon - .06%
Manganese - .30
Phosphorus - .015 Max.
Sulphur - .030 Max.
Silicon - .10 Max.
Copper - .12 Max.
Aluminum - .05
Titanium - .30

As has been mentioned earlier, it has been found empirically that it is important to separate the high resistance magnetic material into thin layers 27, 27 that are spaced apart by the center core 25 of non-magnetic material, and that the resulting effect of loading or coupling power is much better than if the same amount of magnetic material were used as a single thickness beneath the copper core, or if the layers were separated by air. There apparently is a skin effect provided by the four surfaces of the two separated layers 27, 27 which improves the heating effect of the magnetic material to produce unobvious results which are difficult to explain but are easy to measure and appreciate. Perhaps the inducing skin effects in the bottom layer 27 induces a similar skin effect in the top layer 27 to give a double transformer action. This is somewhat contrary to the classical theory of the transformer action of induction heating, but the superiority of the preferred embodiment of an induction heating unit system of this invention is evident from the testing of many combinations of laminated materials. For a given material at a given frequency there is a certain depth of penetration. The past theory says that the copper core 25 does not see the magnetic flux from the induction coil 12, but the power measurements within the utensil speak otherwise.

Modifications of this invention will occur to those skilled in this art, therefore, it is to be understood that this invention is not limited to the particular embodiments disclosed, but that it is intended to cover all modifications which are within the true spirit and scope of this invention as claimed.

What is claimed as new and desired to be secured by Letters Patent of the United States is:

1. An induction surface heating unit system comprising an induction coil with an ultrasonic frequency wave, said coil being mounted beneath a cooking utensil support plate, and a composite plate utensil positioned on the support plate and substantially centered over the said coil, said induction heating coil functioning in a manner as the primary winding of a transformer, said utensil functioning in the manner as a single-turn secondary winding, said composite plate material of the utensil having a center core selected from the group of high thermal conductivity metals and alloys such as copper, silver and aluminum, and an outer skin bonded to the core and selected from the group of magnetic and high electrical resistivity materials such as iron, porcelain enameled steel and martensitic stainless steel.

2. An induction surface heating unit system as recited in claim 1 wherein the said center core material is of a thickness greater than the combined thickness of outer skin for better thermal conductivity.

3. An induction surface heating unit system comprising an induction heating coil, said coil being mounted beneath a cooking utensil support plate, said induction coil functioning in the manner as the primary winding of a transformer; the invention comprising a utensil of a composite plate material which functions in the manner as a shorted single-turn secondary winding such that an alternating magnetic field produced by the induction coil is magnetically coupled across an air gap with the utensil material, said composite plate material having a center core of high thermal conductivity such as copper and a thin outer skin of high resistance magnetic material such as porcelain enameled steel bonded over the core, so that the heating of the utensil takes place in the outer skin of the composite material in the area substantially directly above the underlying heating coil and this heat is transferred by large area conduction to the center core which in turn spreads the heat laterally to obtain generally uniform temperatures within the bottom of the utensil.

4. An induction surface heating unit system as recited in claim 3 wherein the said center core of the composite plate material is of a thickness greater than the combined thickness of the outer skin.

5. An induction surface heating unit system comprising an induction heating coil means adapted to be driven by an ultrasonic output frequency wave, said coil means being covered by a cooking utensil support plate of non-metallic material; the invention comprising a cooking utensil of laminated materials of magnetic material and high electrical resistivity and high thermal conductivity, said laminated utensil material comprising a center core of high thermal conductivity metals and alloys selected from the group comprising copper, silver and aluminum, the core being sealed within an outer skin of ferromagnetic material that is electrically conductive to form a short circuited turn of a transformer of which the primary winding is represented by the said induction heating coil, said ferromagnetic material being selected from the group comprising iron, porcelain enameled steel, martensitic stainless steel and nickel.

6. An electric cooking apparatus comprising an induction heating system having an induction heating coil means that generates an alternating magnetic field, said coil means being covered by a cooking utensil support plate of non-conducting material, and a cooking utensil of laminated materials having a center core of high thermal conductivity metals and alloys selected from the group comprising copper, silver and aluminum, the core being sealed within a thin outer skin of ferromagnetic material that is electrically conductive to form a short-circuited turn of a transformer of which the primary winding is represented by the said induction heating coil, said ferromagnetic material being selected from the group comprising iron, porcelain enameled steel, martensitic stainless steel and nickel.

* * * * *